AUTOMATIC STEERING MECHANISM

Original Filed Jan. 8, 1951 2 Sheets-Sheet 1

INVENTOR.
BENJAMIN H. CISCEL
BY
George H. Fisher
ATTORNEY

AUTOMATIC STEERING MECHANISM

Original Filed Jan. 8, 1951 2 Sheets-Sheet 2

INVENTOR.
BENJAMIN H. CISCEL
BY
George H. Fisher
ATTORNEY

United States Patent Office

Re. 25,097
Reissued Dec. 19, 1961

25,097

AUTOMATIC STEERING MECHANISM

Benjamin H. Ciscel, Altadena, Calif., assignor to Minneapolis-Honeywell Regulator Company, Minneapolis, Minn., a corporation of Delaware Original No. 2,863,622, dated Dec. 9, 1958, Ser. No. 204,924, Jan. 8, 1951. Application for reissue Dec. 16, 1959, Ser. No. 862,435
23 Claims. (Cl. 244—77)

Figure 1A:
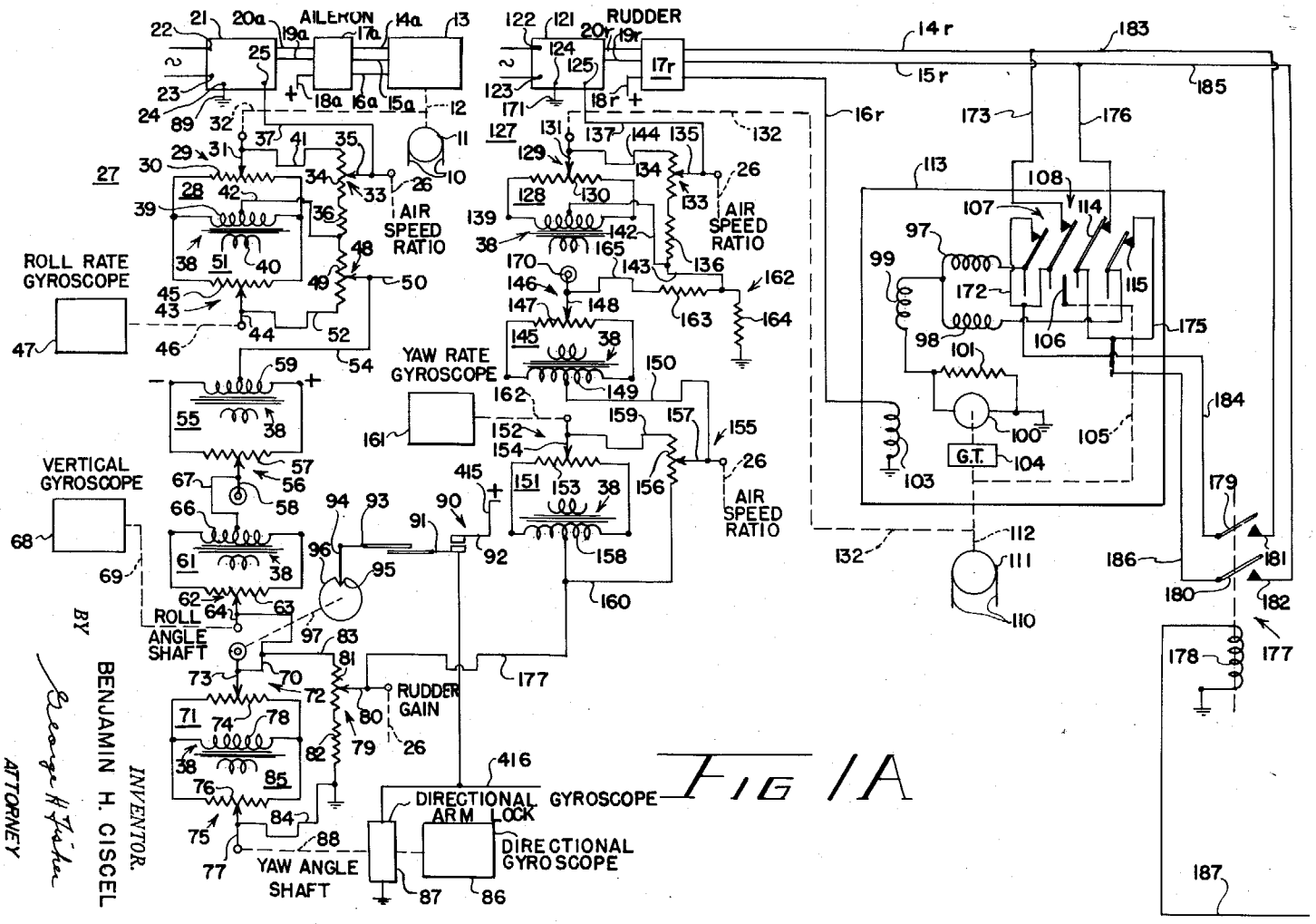

Matter enclosed in heavy brackets [ ] appears in the original patent but forms no part of this reissue specification; matter printed in italics indicates the additions made by reissue.

This invention pertains to automatic steering mechanisms for dirigible craft such as aircraft. Such steering mechanisms for aircraft are commonly referred to as automatic pilots.

The automatic pilot controls the steering of an aircraft, generally, by operating conventionally aileron, rudder, and elevator control surfaces that alter the attitude of the craft about three axes thereof. The operating means for a control surface comprises a motor, which may be electric, hydraulic, or pneumatic. Such motors are in many cases controlled from self-balancing networks for limiting motor movement in proportion to the magnitude of a control signal.

With electric motors, in addition to self-balancing as a measure of extent of motor movement, additionally there may be motor operated limit switches that break the motor energizing circuit after extended motor movement to prevent damage to a control surface by driving it against other fixed portions of the craft.

In aircraft which have a considerable speed range, it is undesirable to permit as great a maximum movement of a control surface at high air speeds as at low speeds since otherwise the control surface effort to change craft attitude at high speed may become so great as to overstress portions of the craft.

It is an object of this invention to vary the maximum allowable movement of a motor that operates a control surface of an aircraft in accordance with the speed of the aircraft.

A further object of this invention is to provide a plurality of pairs of switches, each switch operable by a condition controlling motor, to thus effectively limit by means at any of said pair of switches said motor movement in two directions and to select a particular pair of switches to become so effective to limit motor movement in accordance with the change in a second condition.

In automatic pilots, the motor for operating a control surface is controlled, as stated, by a self-balancing network. Such network may be of the potentiometric type or may be a self-balancing synchro network or the like. Such self-balancing networks have a movable initiating controller and a control surface motor driven follow-up controller.

It is a further object of this invention to vary, in accordance with air speed of the craft, the ratio of the movements of the initiating and follow-up controllers to thus change the extent of movement of a control surface for a given initiating controller movement.

A further object of this invention is to provide a self-balancing voltage network for controlling a motor for operating an aircraft control surface which network includes a plurality of motor operation initiating voltage generators and a follow-up voltage generator in which the voltage output of the follow-up generator for a given operation thereof is varied in accordance with the speed of said aircraft.

A further object of this invention is to control the ailerons and rudder of an aircraft from a common directional control device and to vary in accordance with airspeed the ratio of the control effect applied to said rudder with respect to that applied to said ailerons.

A further object of this invention is to energize said control surface motor through switches operated by a device controlled by a self-balanceable network and to additionally utilize said switches to control an energizing circuit for an actuator that positions a trim tab of said control surface upon continued application of torque to said surface.

A further object of this invention is to operate various ratio adjusting devices to modify the output of voltage generators in a balanceable network for controlling operation of a motor and for selecting various pairs of motor operation limit switches both adjusting and selecting being in accordance with the adjustment of an air speed responsive servo system of the self-balancing type.

The above and further objects of the invention will appear upon reference to the following description and accompanying drawings disclosing a preferred embodiment thereof.

Figure 1B:
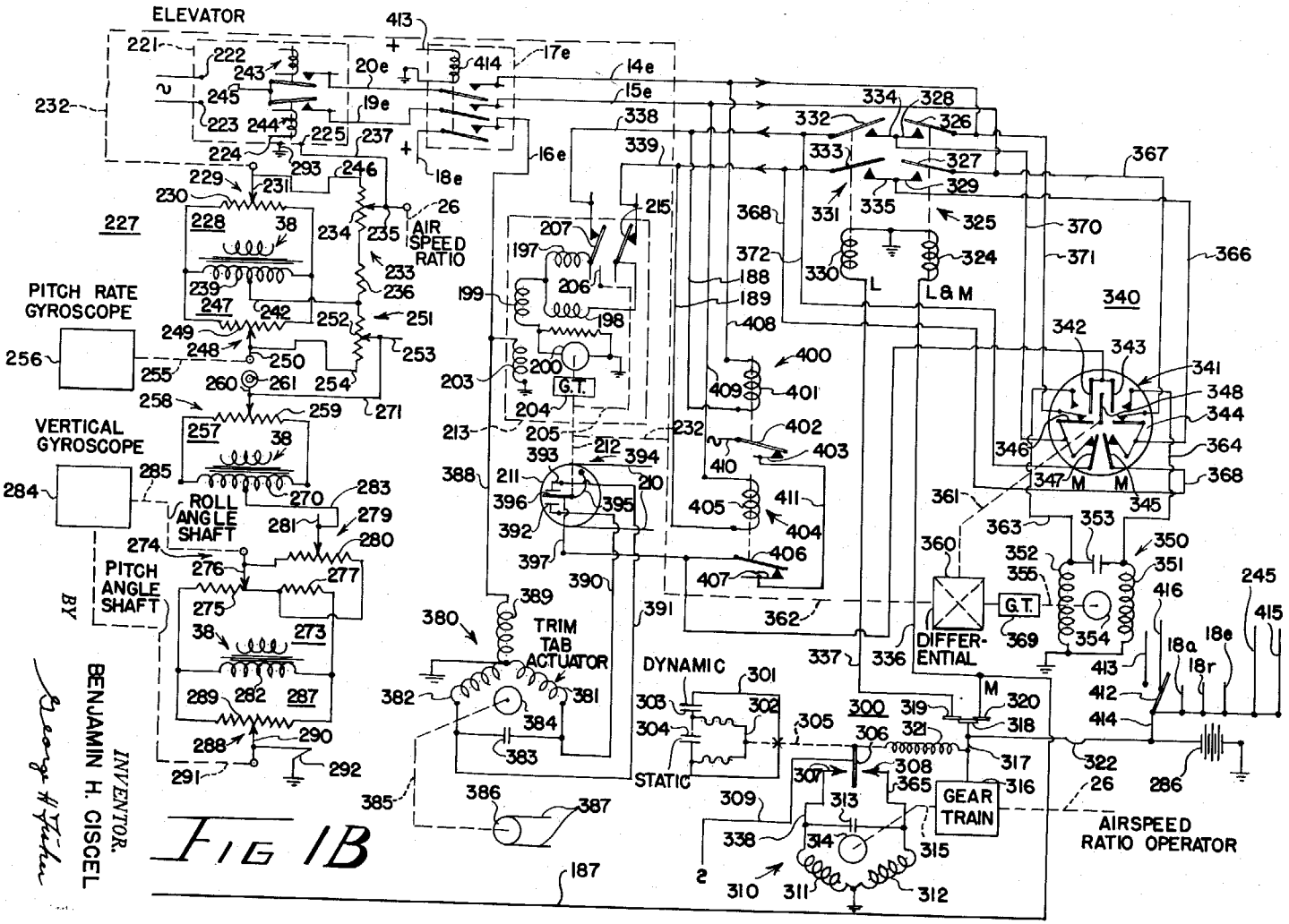

Referring to the drawings:

FIGURES 1A and 1B together diagrammatically illustrate a novel three channel automatic pilot embodying the principles of the invention.

The invention has been illustrated as adapted to a three channel automatic pilot for an aircraft having ailerons, rudder, and an elevator.

In FIGURE 1A, the aileron and rudder channels of the automatic pilot are illustrated and in FIGURE 1B, the elevator channel or third channel of the three channel automatic pilot is illustrated. The ailerons, rudder, and elevator of an aircraft embodying the automatic pilot or steering mechanism may be positioned by hydraulic actuators which themselves have a control valve. This control valve may be positioned by an electric servomotor to be briefly described hereinafter. In some cases where the hydraulic servomotor is not utilized, the electric servomotor itself may directly position a control surface.

Each electric servomotor is reversibly controlled through an engage relay from a phase sensitive discriminator type of amplifier. Signals to be discriminated by the amplifier are derived from a balanceable network connected to the control electrodes of the amplifier. Each network includes position-maintaining means for upsetting the balance of the network upon change in angular position of the craft about an axis controlled by the control surface associated with that axis, for example, the aileron network includes a roll responsive device operative upon change in attitude about the roll axis of the aircraft to operate the ailerons to restore the craft to original position. Each network additionally includes a follow-up device operated by its associated servomotor to rebalance its network.

Due to the fact that a displaced control surface exerts a vastly greater turning effort on the aircraft at higher air speeds than at low air speeds, the mount of control surface displacement and therefore follow-up displacement required to balance a given unbalancing signal is decreased as air speed increases.

While it is apparent that the follow-up device normally limits the amount of motor rotation in a balanceable system, it has been found desirable to provide adjustable means for predetermining the maximum displacement applied to a control surface in order to prevent excessive stress on the craft due to large turning efforts on the control surface. Thus air speed responsive means variably adjust the maximum motor limit positioning means to decrease this maximum position with increase in air speed.

Since a persistent external force operating on the plane to change its position about an axis thereof which is sensed by a position-maintaining means results in a permanent displacement from a normal position of a control surface and therefore a permanent counterforce on said surface, novel means have been provided for balancing the external force on said surface to relieve the servomotor from exerting the necessary effort to counterbalance the force of the air stream on the displaced surface.

For a better understanding of the present invention, a detailed description thereof follows which should be considered along with the accompanying drawings. In FIGURE 1A, aileron and rudder channels of the automatic pilot are correspondingly indicated. The ailerons (not shown) are positioned by means of cables 10 extending from a cable drum 11. Cable drum 11 is driven by output shaft 12 of a servomotor 13. The detailed construction of the servomotor 13 will be subsequently considered. Extending from an aileron relay 17A to the aileron servomotor 13 are three conductors 14A, 15A, and 16A. Conductor 16A serves to control means for locking the cable drum 11 to the servomotor so that the cable drum 11 is only positioned when the servomotor 13 operates but is otherwise held against movement. Conductor 14A controls means for rotating the servomotor in one direction and conductor 15A controls means for rotating motor 13 in the opposite direction. Extending to the aileron relay 17A are conductors 18A, 19A, and 20A. Engine relay 17A, as will become clear, serves to connect conductors 18A, 19A, and 20A respectively with conductors 16A, 15A, and 14A. Conductor 18A is connected to a source of direct voltage whereas conductors 19A and 20A extend from a phase sensitive discriminator type of amplifier 21.

The aileron amplifier 21 has power input terminals 22, 23 connected to a source of alternating voltage and signal input terminal 24, 25 connected to a balanceable network which supplies control signal voltages to the amplifier. The direction of rotation of the aileron servomotor 13 depends upon the phase relationship between the voltage across signal input terminals 24, 25 with respect to that across power input terminals 22, 23. The amplifier may be such as is disclosed in a patent to Willis H. Gille et al. 2,425,733 dated August 19, 1947.

The amplifier signal input terminals 24, 25 are connected to the output members of a balanceable bridge network 27. Network 27 comprises a follow-up voltage generating potentiometer 28, a roll rate gyroscope voltage generating potentiometer 51, a trim voltage generator potentiometer 55, a vertical gyroscope roll angle voltage generator potentiometer 61, a manually operable voltage generating potentiometer 71, and a heading stabilizing voltage generator potentiometer 85. Generator 28 comprises a follow-up potentiometer 29 having a resistor 30 and a slider 31; a potentiometer voltage divided 33 comprising a slider 35 and a resistor 34, a fixed resistor 36; and a transformer 38 having a primary winding 40 and a secondary winding 39. Resistor 30 is connected across the ends of secondary winding 39. Slider 31 is positioned along resistor 30 by a follow-up operating connection 32 extending from the output shaft 12 of the servomotor 13. Resistors 34 and 36 are connected in series. A conductor 41 extends from the free end of resistor 34 to slider 31, and a conductor 42 extends from the free end of resistor 36 to a center tap of secondary winding 39. Slider 35 is adjusted along resistor 34 in accordance with changes in air speed through an operating connection 26. A conductor 37 extends from the slider 35 to input terminal 25 of amplifier 21.

Voltage generator 51 comprises a roll rate gyro potentiometer 43 having a slider 44 and a resistor 45; a voltage dividing potentiometer 48 having a resistor 49 and a slider 50; and secondary winding 39 of transformer 38. Resistor 45 is connected in parallel with resistor 30 across the secondary winding 39. Resistor 49 has one end connected to the junction of resistor 36 and conductor 42 and the opposite end of resistor 49 is connected by conductor 52 to slider 44. Slider 50 is manually adjusted along resistor 49 for a purpose to be clarified. Slider 44 is adjusted along resistor 45 by means of a suitable operating connection 46 from a roll rate gyroscope 47. The roll rate gyroscope 47 may be of a conventional type whose rotor has two axes of rotation, one being the spin axis and the other is the precession axis. The rotor is freely rotatable about its spin axis but precession about the other axis is restrained by a suitable spring means. The gyroscope is so mounted on the craft that the displacement of slider 44 with respect to resistor 45 through the connection of a slider 44 with the gyroscope is a measure of the rate of roll of the aircraft about the longitudinal axis.

Voltage generator 55 comprises a trim potentiometer 56 having a resistor 57 and a slider 58 and a transformer 38 having a secondary winding 59. Inasmuch as a single primary winding of a transformer may supply a plurality of secondary windings, the various secondary windings are embodied in the same transformer 38. Resistor 57 of potentiometer 56 is connected across the secondary winding 59. Slider 58 may be manually adjusted along resistor 57 for the purpose of changing the trim or normal position of the craft about the roll axis. A conductor 54 connects slider 50 of potentiometer 48 and a center tap of secondary winding 59.

Voltage generator 61 comprises a roll angle potentiometer 62 having a resistor 63 and a slider 64 and a secondary winding 66 of transformer 38. A conductor 70 extends from slider 58 to a center tap of secondary winding 66. Slider 64 is positioned along resistor 63 by means of a suitable operating connection 69 operated by a vertical gyroscope 68.

The gyroscope 68 is of a conventional type having a rotor with freedom of movement about 3 axes. The rotor is carried by an inner gimbal ring for rotation about a vertical spin axis. The inner gimbal ring in turn is mounted for rotation about a horizontal axis in an outer gimbal ring. The outer gimbal ring in turn has angular movement about a second horizontal axis at right angles to the first horizontal axis mentioned. The arrangement is such that upon movement of the craft about the roll axis slider 64 is moved relative to resistor 63 from the midpoint thereof in proportion to the magnitude of the angle of roll and in a direction depending on direction of roll.

Voltage generator 71 comprises a turn control potentiometer 72 having a slider 73 and a resistor 74 and a secondary winding 78 of transformer 38. Resistor 74 is connected across the ends of secondary winding 78 and slider 73 is manually adjusted along resistor 74. A conductor 70 extends from slider 64 to slider 73.

Voltage generator 85 is an automatic heading maintaining potentiometer 75 having a resistor 76 and a slider 77 and secondary winding 78 of transformer 38. Resistor 76 is connected across the ends of secondary winding 78. A conductor 84 extends from slider 77 to ground and thus connects with the amplifier ground lead 89 connected to amplifier terminal 24.

Slider 77 is positioned along resistor 76 from the midpoint thereof in either direction by means of an operating connection 88 extending from a directional gyroscope 86. The directional gyroscope 86 is of a type having a rotor freely rotatable about a horizontal spin axis in an inner gimbal ring. The inner gimbal ring in turn is carried in a vertically positioned outer gimbal ring for rotation about a horizontal axis at right angles to the rotor spin axis. The outer ring in turn is freely rotatable about a vertical axis. The arrangement is such that upon change in heading of the craft slider 77 is moved relative to resistor 76 in proportion to the magnitude and direction of the change in heading.

The motion of the vertical gimbal ring of the directional gyroscope is transmitted to slider 77 through a directional gyroscope arm lock 87. The directional arm lock is a device used when manual changes of heading of aircraft are to be effected through the automatic steering mechanism to prevent the transmission of movement from the directional gyroscope to slider 77. The directional arm lock may be of the type disclosed in U.S. patent application 447,989 of Willis H. Gille filed June 22, 1942, now U.S. Patent No. 2,750,602. Although a directional gyroscope has been illustrated as one form of heading maintaining device, it will be appreciated that such heading maintaining device may assume the form of a compass or gyro magnetic compass.

The directional gyroscope arm lock 87 is energized through a manual turn control operated switch 90. Switch 90 comprises a contact arm 92 pivoted at one end and bearing a contact making element at its free end, and a lever 91 pivoted intermediate its ends and having a contact making element at one end engageable with the contact on arm 92. The lever 91 is actuated by a lever 93 pivoted intermediate its ends. Lever 93 has a laterally extending portion 94 which engages in a notch 95 of a disc 96. Disc 96 is rotated by an operating connection 97 from the knob for positioning the slider 73. The arrangement is such that upon rotation of the disc 96 in either direction the portion 94 rides up on to the periphery of the disc 96 thereby rotating the lever 93 clockwise and the lever 91 in turn counterclockwise to engage the contacts on levers 91 and 92. A circuit is thereby completed through switch 90 from a source of direct voltage connected to a conductor 415 to the directional arm lock 87 to thereby prevent operation of slider 77 from directional gyroscope 86.

In the rudder channel, the positioning of the rudder is controlled by cables 110 extending from a cable drum 111 driven by the output shaft 112 of a rudder servomotor 113. Connected to the rudder servomotor are conductors 14R, 15R, and 16R. The conductor 16R serving to operate means for locking the rudder positioning means with the rudder servomotor 113 and the conductors 14R and 15R controlling the energization for means for operating the output shaft 112 in one direction or another. The conductors 14R, 15R, and 16R are coupled respectively to the conductors 20R, 19R, and 18R through a rudder engage relay 17R. Conductors 19R and 20R constitute the output conductors of a phase sensitive rudder amplifier 121 which reversibly controls the rudder servomotor 113. The rudder amplifier is similar to the aileron amplifier 21 and is of the phase sensitive discriminator type and serves to discriminate and therefore energize one conductor 19R or conductor 20R depending upon the phase relationship of the voltage across power input terminals 122, 123, connected to a source of alternating voltage and the signal voltage across signal input terminals 124, 125. The conductor 18R is connected to a source of direct current. Connected to the signal input terminals 124 and 125 is a balanceable network 127 containing various voltage signal generators with the network supplying a resultant control signal to the amplifier input terminals.

Network 127 comprises a follow-up voltage signal generator 128; a trim voltage signal generator 145; a yaw rate signal generator 151; and a rudder gain signal generator 79.

Voltage generator 128 comprises a servo follow-up potentiometer 129 having a resistor 130 and a slider 131; a ratio potentiometer 133 having a resistor 134 and a slider 135; a fixed resistor 136; and a secondary winding 139 of transformer 38. Resistor 130 is connected across the ends of secondary winding 139. Slider 131 is positioned along resistor 130 by a suitable operating connection 132 extending from the servomotor output shaft 112. Resistors 134 and 136 are connected in series and the free end of resistor 134 is connected to slider 131 by conductor 144. The free end of resistor 136 is connected by conductor 142 to a center tap of secondary winding 139. Slider 135 is positioned along resistor 134 in accordance with changes in air speed from an operating connection 26. The conductor 137 extends from slider 135 to amplifier input terminal 125.

Voltage generator 145 comprises a trim potentiometer 146 having a resistor 147 and a slider 148 and a secondary winding 149 of transformer 38. Resistor 147 is connected across the ends of secondary winding 149. The slider 148 is positioned along resistance 147 by a suitable manually operable knob 170.

The voltage signal generator 151 comprises a yaw rate potentiometer 152 comprising a resistor 153 and a slider 154; a voltage dividing potentiometer 155 having a resistor 156 and a slider 157 and a secondary winding 158 of transformer 38. Resistor 153 is connected across the secondary winding 158. Resistor 156 has one end connected by conductor 159 to slider 154 and the opposite end thereof connected by conductor 160 to a center tap of secondary winding 158. A conductor 150 extends from a center tap of secondary winding 149 of the trim voltage generator 145 to slider 157. Slider 157 is positioned along resistor 156 in accordance with air speed by an operating mechanism 26. Slider 154 is positioned along resistor 153 from the midpoint thereof in either direction. The extent of movement of slider 154 depends upon the rate of yaw of the craft and the direction of the movement of slider 154 from the midpoint depends upon the direction of yaw. The slider 154 is positioned through an operating means 162 by a yaw rate gyroscope 161. The yaw rate gyroscope is similar to the roll gate gyroscope 147 and is so arranged on the craft that slider 154 is displaced relative to resistor 153 in a direction and magnitude depending upon the direction and rate of change of yaw.

Voltage generator 79 comprises a voltage divider or rudder gain potentiometer 79 having a resistor 81 and a slider 80. The resistor 81 is connected in series with a fixed resistor 82 with the free end of resistor 81 connected by conductor 83 to slider 73 and the free end of resistor 82 is connected to ground. Slider 80 is positioned along resistor 81 in accordance with changes in air speed by operating means 26 to provide coordinated turns at all airspeeds.

It will be apparent in the rudder network that potentiometers 79, 155 and generator 145 are all connected in series with the slider 148 and the ground end of resistor 82 constituting the output terminals of the series connected elements. Only a portion of the voltage between the slider 148 and ground is utilized. This portion is effectively selected by a voltage divider 162. The voltage divider comprises a fixed resistor 163 and a fixed resistor 164 connected in series. The free end of resistor 164 is connected to ground and the free end of resistor 163 is connected by conductor 165 to slider 148. A conductor 143 extends from the junction of resistors 163, 164 to the center tap of secondary winding 139 of voltage generator 128. Thus the effective network or control circuit for amplifier 121 consists of the voltage drop across resistor 164 along with the voltage from generator 128 with the ground end of resistor 164 connected by ground lead 171 to amplifier terminal 124.

Reverting to the rudder servomotor 113, the motor is of the reversible D.C. type. The motor comprises two field windings 97, 98; a clutch winding 99 in series with either field winding, and an armature 100 in series with the clutch winding 99. A resistor 101 is connected in parallel across the armature 100. Between the free end of motor winding 97 and its energizing conductor 14R are two series connected limit switches 107, 108. Also connected between the free end of motor field winding 98 and its energizing conductor 15R are two motor operable limit switches 114, 115 connected in series.

Each limit switch consists of a pivoted contact arm normally engaged with a related contact. Each pivoted arm has an actuating arm operably connected therewith. The actuating arms for switches 107 and 108 are circumferentially spaced with respect to a normal position assumed by an engaging arm 106 for these actuating arms.

Similarly the actuating arms for limit switches 114 and 115 are circumferentially spaced on the opposite side of said actuating arm 106 so that the actuating arms for switches 108 and 114 are engaged for equal angular movements but opposite direction of movements of arm 106 and similarly the actuating arms for switches 107 and 115 are engaged by arm 106 upon equal angular movements but opposite direction of movements of arm 106. The operative connection between the actuating arms and the pivoted arms is such as to permit the engaging arm 106 to override the nearer actuating arms of switches 108 and 114 to engage the actuating arms of the remote switches 107 and 115 and furthermore is so constructed as to permit overriding by the arm 106 of the actuating arms for switches 108 and 114 upon return movement of the engaging arm 106.

The engaging arm 106 is operated by the drive means 105 extending from the gear train 104. A winding 103 energized by conductor 16R serves to couple the armature 100 in driving relationship with the gear train 104. This driving engagement may be effected by a suitable magnetic clutch whose winding corresponds with coil 103.

The motor clutch combination consisting of the field windings 97, 98, clutch winding 99, and armature 100 is of the type wherein the armature is coupled to a drive shaft upon energization of the clutch winding 99 but when said clutch coil is no longer energized the drive shaft is automatically moved to engage a brake surface to prevent operation thereof. The clutch is energized concomitantly with the energization of either motor field winding. The arrangement may be similar to that disclosed in the patent to Lear et al. 2,267,114 dated December 23, 1941. Field winding 97 is connected to conductor 14R by conductor 173, the contact of limit switch 108, the operating arm of switch 108, conductor 172, contact of limit switch 107, operating arm of limit switch 107, winding 97, through clutch coil 99, armature 100 or resistor 101 to ground. Similarly the energization circuit for winding 98 comprises conductor 15R, conductor 176, contact of limit switch 114, operating arm of switch 114, conductor 175, contact of limit switch 115, operating arm of limit switch 115, winding 98, clutch coil 99, armature 100 or resistor 101 in parallel, to ground. If arm 106 is rotated in either direction a sufficient angular distance, limit switches 108 or 114 will be opened to prevent further energization of the motor. The limit switches 107 and 115 become effective to limit greater servomotor rotation by supplying under certain air speed conditions to be described a shunting circuit about the limit switches 108, 114.

The shunting circuit is controlled by a relay 177 having an operating coil 178 and two operable arms 179, 180 which respectively coact with make contacts 181 and 182. A conductor 183 extends from conductor 14R to contact 181 and a conductor 184 extends from arm 179 to conductor 172 associated with limit switches 107, 108. A conductor 185 extends from conductor 15R to contact 182 in relay 177 and a conductor 186 extends from the associated relay 180 to conductor 175 associated with limit switches 114, 115.

The third channel of the automatic pilot and shown in FIGURE 1B will now be described. The position of the elevator of the aircraft is controlled by cables 210 extending from cable drum 211 driven by the output shaft 212 of an elevator servomotor 213. The elevator servomotor 213 is similar to the aileron servomotor 13 but differs from the rudder servomotor 113 in that it includes but one pair of limit switches 207, 215. Switches 207, 215 correspond with switches 107, 115 of the rudder servomotor which permit the maximum allowable rotation of the servomotor before a limit switch is operated. The switches 207 and 215 are operated by an arm 206 driven from output shaft 212 of gear train 204 through a further shaft 205. The elevator servomotor includes a clutch operating coil 199 which is energized concomitantly with the energization of the motor and serves to drivably connect the armature 200 of the motor with a drive shaft of gear train 204. The gear train includes an operating coil 203 for drivably connecting the gear train drive shaft with the output shaft 212. The energization of coil 203 is controlled by a conductor 16E connected thereto, and the direction of rotation of the servomotor 213 is alternatively controlled by conductors 14E, 15E through an air speed controlled arrangement to be described.

Conductors 14E, 15E, and 16E are associated respectively with conductors 20E, 19E, and 18E through a triple pole single make elevator engage relay 17E. Conductors 19E and 20E constitute the output elements of an elevator amplifier 221. Conductor 18E like conductors 18A and 18R is connected to a source of D.C. voltage such as a grounded battery 286.

The elevator channel amplifier is similar to the aileron amplifier 13 and comprises terminals 222, 223 connected to the source of alternating voltage and the signal input terminals 224, 225 connected to a source of control signal. The amplifier 221 includes two single pole make relays 243, 244. One or the other of the relays is energized depending upon the phase relationship between the voltage across the signal input terminals 224, 225 and the source voltage applied across terminal 222, 223. The relays serve to connect conductors 19E or 20E depending upon which relay is operated to a conductor 245 extending from the grounded battery 286.

The arrangement for providing the control signals to the amplifier 221 comprises a balanceable voltage network 227. The network 227 comprises a follow-up voltage generator 228, a pitch rate voltage generator 247, a trim voltage generator 257, an up elevator voltage generator 273, and a pitch angle voltage generator 287.

Voltage generator 228 comprises a follow-up potentiometer 229 comprising a resistor 230 and a slider 231; an air speed ratio potentiometer 233 comprising resistor 234 and a slider 235; a fixed resistor 236; and a secondary winding 239 of transformer 38. Resistor 230 is connected across the secondary winding 239. Resistors 234 and 236 are connected in series with the free end of resistor 234 connected to slider 231 by conductor 246 and the free end of resistor 236 connected to a center tap of secondary winding 239 by conductor 242. A conductor 237 extends from slider 235 to signal input terminal 225 of amplifier 221. Slider 231 of the follow-up potentiometer 229 is operated by the output shaft 212 of servomotor 213 through a suitable operating connection 232. Slider 235 is positioned along resistor 234 by an operator 26 in accordance with changes in air speed.

Rate signal generator 247 comprises a pitch rate potentiometer 248 having a resistor 249 and a slider 250; a ratio potentiometer 251 comprising a resistor 252 and a slider 253; and secondary winding 239 of transformer 38. Resistor 249 is connected across the secondary winding 239. One end of resistor 252 is connected to the junction of fixed resistor 236 and conductor 242; the opposite end of resistor 252 is connected to slider 250 by conductor 254. Slider 253 is manually adjusted along resistor 252, and slider 250 is adjusted along resistor 249 by an operating connection 255 extending from a pitch rate gyroscope 256.

Pitch rate gyroscope 256 is similar to roll rate gyroscope 47 in that it is a gyroscope having angular freedom about two axes but with its angular movement about one axis thereof restrained by suitable return means such as springs. The gyroscope is so arranged in the craft that the slider 250 is moved by the gyroscope with respect to the resistor 249 in a direction and a magnitude depending upon the rate of pitch of the aircraft.

The trim signal voltage generator 257 comprises a manually operable trim potentiometer 258 having a resistor 259 and a slider 260, the resistor being connected across a secondary winding 270 of transformer 38. Slider 260 is positioned across resistor 259 by a manually operable trim control knob 261 in either direction from the midpoint of said resistor 259 in accordance with the desired change in trim of the craft to be applied. The conductor 271 extends from slider 260 to slider 253 of voltage generator 247.

Voltage generator 273 comprises an up elevator potentiometer 274 having a resistor 275 and a slider 276; and an up elevator coordination potentiometer 279 comprising a resistor 280 and a slider 281; a fixed resistor 277; and a secondary winding 282 of transformer 38. Resistors 275 and 277 are connected in series with the remaining end of resistor 275 connected to one end of secondary winding 282 and the remaining end of resistor 277 connected to the opposite end of secondary winding 282. Resistor 280 is connected between slider 276 and the junction of resistors 275 and 277. The conductor 283 extends from a center tap of secondary winding 270 of generator 257 to slider 281 of the co-ordination potentiometer 279. Slider 276 is positioned along resistor 275 in accordance with the roll angle of the craft by means of an operating connection 285 extending from vertical gyroscope 284. The driving connection between the vertical gyroscope and the operating means 285 is such that the slider 276 is moved from its illustrated position toward the left irrespective of the direction that the craft rolls about its longitudinal axis from a horizontal position. Slider 281 is adjusted along resistor 280 manually.

The vertical gyroscope 284 is the same as the vertical gyroscope 68 in that it has a rotor with a vertical spin axis which rotor is carried in a cross gimbal mounting for rotation about two respectively perpendicular horizontal axes. The vertical gyroscope is so arranged on the aircraft that upon movement of the craft about its longitudinal axis the slider 276 is moved with respect to the resistor 275. While two vertical gyroscopes have been illustrated, in practice, it may be desirable to utilize a single vertical gyroscope with the operating means 285 being replaced by the roll angle operating means 69 of vertical gyroscope 68.

Voltage generator 287 comprises a pitch angle potentiometer 288 having a resistor 289 and a slider 290 with the resistor connected across a secondary winding 282 of transformer 38. The slider 290 is positioned along resistor 289 in accordance with the angle of pitch of the craft by a suitable operating connection 291 extending from gyroscope 284. A conductor 292 extends from slider 290 to ground to complete the connection of the network to amplifier signal input terminal through amplifier ground conductor 293 extending from signal input terminal 224.

An air speed responsive arrangement 300 for varying the voltage output of various network signal generators and for selecting in accordance with air speed one of several pairs of limit switches for limiting maximum servomotor rotation comprises a pressure sensitive chamber 301 and a pressure rebalancing apparatus comprising motor 310 and gear train 316. The chamber 301 houses a bellows 302 mounted to one end of the chamber. Communicating with the interior of chamber 301 and the exterior of bellows 302 is a pressure line 303 which is supplied with the impact or dynamic air pressure of an air speed sensing device such as a pitot tube. Communicating with the interior of bellows 302 through the fixed wall thereof is a conduit 304 for supplying static pressure to the bellows interior. The differential pressure on the exterior and interior of the bellows results in expansion or contraction of the bellows casing 302 which movement is communicated by slide rod 305 to the exterior of the casing 301. Intermediate its ends the slide rod 305 carries a contact arm 306 situated between narrow space opposed contacts 307, 308. Contact 307 is connected by conductor 333 directly to phase winding 311 of a capacitor type induction motor 310, the opposite end of the winding being connected to ground. Contact 308 is connected by conductor 365 directly to the other phase winding 312 of the motor 310, the opposite end of winding 312 being connected to ground. A condensor 313 is connected across the contact ends of both motor windings 311, 312. The motor includes a conventional rotor 314. Alternating current is supplied to the contact arm 306 by conductor 309 extending from the alternating current source.

The output shaft 315 extending from rotor 314 drives into a gear train 316. Gear train 316 includes an output shaft 26 which is operatively connected respectively to sliders 35 of voltage generator 28, slider 80 of the rudder gain potentiometer 79, slider 135 of voltage generator 128, slider 157 of voltage generator 151, and slider 235 of voltage generator 228. Additionally the gear train 316 operates through an arrangement such as a pinion and rack a linear movable member 317. A spring 321 has one end connected to member 317 and its opposite end connected to the free end of slide rod 305. Thus if the dynamic pressure increases and causes compression of bellows 302, the slide rod 305 is moved toward the left in the illustration engaging arm 306 with contact 307 to thereby energize motor 310. Motor 310 drives through the gear train the linear movable member 317 and causes it to move to the right to increase the tension in spring 321 until the arm 306 is again brought intermediate contacts 307 and 308. It is apparent that the amount of movement given member 317 depends upon the increase of tension required in spring 318 to offset the increase in dynamic pressure applied to bellows 302. The movement of member 317 and thus operating means 26 is in proportion to the change in air speed. It is thus apparent that the sliders referred to as being positioned by operating means 26 are adjusted in accordance with changes in air speed.

The linear movable member 317 carries at its opposite end in insulated relation a slidable contact 318 which at low air speeds of the aircraft engages two contacts 319, 320 spaced in the path of said movable member 317. As indicated, contact 319 is the low air speed contact and contact 320 is the medium air speed contact. A conductor 322 extends from the source of D.C. voltage 286 to the slidable contact 318. A conductor 187 extends from medium air speed contact 320 to operating coil 178 of relay 177 whose opposite end is grounded. This relay when energized at low and medium air speeds renders ineffective the narrow limit switches 108, 114 of the rudder servomotor 113. At high air speeds, with slidable contact beyond contact 320, the relay 177 is deenergized and the narrow limit switches are effective.

A conductor 336 extends from medium air speed contact 320 to one end of an operating coil 324 of a two pole double make relay 325, the opposite end of coil 324 being connected to ground. Relay 325 includes two arms 326, 327 which engage respectively with make contacts 328 and 329. A conductor 337 extends from medium contact 319 to one end of operating coil 330 of a two pole double make relay 331, the opposite end of coil 330 being connected to ground. Relay 331 includes arms 332 and 333 which respectively engage with make contacts 334 and 335. It is thus evident that at low air speeds both coils 330 and 324 of relays 331 and 325 are energized but at medium air speeds only coil 324 is energized. Conductor 14E is connected to relay arm 326, and a conductor 15E is connected to relay arm 327. Contact 328 of relay 325 is connected to contact 334 of relay 331. Contact 329 of relay 325 is connected to contact 335 of relay 331. A conductor 338 extends from relay arm 332 to the contact of limit switch 207 in elevator servomotor 213, and conductor 339 extends from relay arm 333 to the contact of limit switch 215 in elevator servomotor 213. With both relay coils 330 and 324 energized to thus cause movement of the relay arms of relays 325 and 331 to closed or make position, the circuit for energizing the field windings of elevator servomotor 213 pass directly from conductors 14E and 15E through limit switches 207 and 215 in elevator servomotor 213. The limit switches 207 and 215 thus for slow air speeds permit the maximum permissible rotation of servomotor 213.

As the air speed of the aircraft increases, the apparatus provides for reduction in the maximum allowable rotation of the servomotor through an auxiliary limit switch arrangement 340.

The arrangement 340 includes a supporting member 341 for centering motor control switches 342, 343; high air speed servomotor limit switches 344, 346; and medium air speed servomotor limit switches 345, 347. Rotatable arm 348 serves to actuate operable arms of each of the switches. Switches 342 and 343 have their operable arms positioned on opposite sides of the actuating arm 348 in close proximity thereto. The arms of switches 342 and 343 are normally disengaged from their respective contacts. The relationship of the actuating arm 348 and the operable arms of switches 342 and 343 is such that when the arm 348 rotates in one direction it closes one or the other of switches 342 and 343. The actuating arm 348 is permitted to rotate beyond the position in which it closed either of centering motor control switches 342 and 343. Upon reversed rotation of arm 348, it serves to again operate the operable arm of the closed switch and move it to unoperated position.

Peripherally spaced about the path of the actuating arm 348 and adjacent the switches 342 and 343 are the high air speed limit switches 346 and 344 respectively. Switches 344 and 346 are normally closed, and upon sufficient rotation of arm 348 in either direction one or the other of the limit switch arms is disengaged from its contact. Finally along the peripheral path of arm 348 are the medium air speed limit switches 345 and 347. Switches 345 and 347 are normally closed and their operable arms are disengaged from their respective contacts upon rotation of arm 348 a sufficient angular distance to operate them. The operable arms of switches 344, 345, 346, and 347 permit the switch actuating arm 348 to rotate beyond the position of the operable arm and yet permit the actuating arm 348 to move the operable arm of the switch to its closed position upon reverse rotation to normal position of actuating arm 348. The operable arms of switches 342 and 343 are connected together by a conductor and thence through normally closed contacts of relays 400 and 404 (to be discussed) to a source of alternating voltage. The contact of switch 342 is connected by conductor 363 to one end of a phase winding 352 of a centering motor 350 the opposite end of phase winding 352 being connected to ground. The contact of centering motor control switch 343 is connected by conductor 364 to the other phase winding 351 of motor 350. Motor 350 is of the capacitor type induction motor and has a condenser 353 connected across the ungrounded ends of phase winding 351, 352. The motor 350 includes a conventional induction rotor 354.

The actuating arm 348 is rotated by an output shaft 361 driven by a middle arm of a conventional gear differential 360. The middle arm may consist of a spider gear carrying planetary gears which mesh on opposite sides with two sun gears which form the input to the differential. One of the sun gears of the differential is operated through gear train 369 by shaft 355 extending from the rotor 354 of induction motor 350, and the other sun gear of the differential is rotated by an operating shaft 362 connected to the follow-up drive 232 of the elevator servomotor 213.

The purpose of motor 350 is to centralize the actuating arm 348 in its peripheral path so that it is equidistant in angular movement from either of the operable arms for switches 344 or 346 and is thus symmetrical relative to both. In normal operation, during stabilized flight, when the automatic steering mechanism is controlling, the elevator of the aircraft, and therefore the follow-up drive 362 are ordinarily subjected to small transient displacements involving approximately the same time in either direction about a normal position of the elevator. Thus the actuating arm 348 is rotated from its midposition shown in one direction upon movement of the elevator in one direction by elevator servomotor 213 to close switch 342 for example to energize motor 350. Shortly thereafter the arm 348 along with the elevator is rotated in an opposite direction beyond the normal position to open switch 342 and close switch 343 to cause motor 350 to rotate in the opposite direction. Thereafter in normal operation, the elevator is moved back to its normal position while the actuating arm 348 is also moved back to its normal position shown to open switch 343. As a result of this action, motor 350 maintains arm 348 centered about the average operating position of servomotor 213.

When the elevator assumes a new average position displaced from its original position due to a change in trim, the displacement of actuating arm 348 to one side due to the new position of the elevator 362 closes for a longer period one or the other of switches 342, 343 depending on the direction of change in trim. Such closed switch will energize the centering motor 350 which through its output shaft 355 and gear train 365 will rotate the sun gear of differential 360 and the middle arm connected to shaft 361. This movement is transmitted to actuating arm 348 until it is moved back to midposition between the operable arms of switches 342 and 343 and thus is equi-distant from the operable arms of limit switches 344 and 346. Thus the arm 348 for actuating the limit switches is symmetrically positioned with respect to the high air speed limit switch operable arms.

The operable arm of limit switch 344 is connected to the contact of limit switch 345 and a conductor 366 extends from their junction to the connected contacts 329 and 335 of relays 325 and 331. A conductor 367 extends from the fixed contact of switch 344 to relay arm 327. A conductor 368 extends from the operable arm of limit switch 345 to conductor 339. The operable arm of limit switch 346 is connected to the contact of limit switch 347, and a conductor 370 extends from their junction to the connected contacts 328, 334. A conductor 371 extends from the fixed contact of limit switch 346 to the conductor 14E. A conductor 372 extends from the operable arm of limit switch 347 to the conductor 338. It will now be apparent that for low air speeds and with operating coils 324 and 330 of relays 325 and 331 energized to close the relay arms 326, 327, and 332 and 333 that the servomotor input conductors 338 and 339 are directly connected to conductors 14E and 15E. If the engage relay 17E is energized and should amplifier relay 243 be operated, conductor 14E is connected to a source of direct voltage which is applied through relay sections 326, 332 to conductor 338 to cause rotation of the servomotor in one direction. If the amplifier relay 244 be operated, the conductor 15E is connected to a source of direct voltage which is supplied directly through the closed relay arms 327, 333 to the servomotor input conductor 339 to effect rotation of the servomotor in the opposite direction.

Should the air speed of the craft increase to a medium value, the slidable contact 318 moves to the right in FIGURE 1B to engage only medium contact 320 and thus breaks contact 319 to deenergize operating coil 330 of relay 331. If the elevator amplifier 221 operates relay 243 to energize conductor 14E, a circuit is extended from conductor 14E, relay arm 326, contact 328, conductor 370, medium air speed limit switch 347, conductor 372, and servomotor conductor 338, limit switch 207, through motor 213 and return to battery 286. Similarly if amplifier relay 244 be operated to energize conductor 15E a circuit is extended therefrom to relay arm 327, contact 329, conductor 366, medium limit switch 345, conductor 368, to the servomotor conductor 339, limit switch 215, servomotor 213, and return to battery 286.

Should the speed of the aircraft increase to a high value, the rebalancing motor 310 in moving the member 317 to increase tension in spring 21 in order to balance the increased pressure in bellows 302 due to the increase in air speed will move the slidable contact 318 to the right and off the medium air speed contact 320. Thus neither operating coil 330 of relay 331 or operating coil 324 of relay 325 is energized. Should amplifier relay 243 be energized, direct voltage is applied through the operated engage relay 17E to conductor 14E and thence extended through conductor 371, high air speed limit switch 346, medium air speed limit switch 347, conductor 372, servomotor conductor 338, limit switch 207, motor field winding 197, clutch coil 122, armature 200, to ground and to battery 286. Similarly if amplifier relay 244 be operated direct voltage is applied through operated engage relay 17E to conductor 15E and is further led therefrom by conductor 367, high air speed limit switch 344, medium air speed limit switch 345, conductor 368, servomotor conductor 339, low air speed limit switch 215, motor winding 198, clutch coil 199, armature 200, to ground and return to battery 286. Thus during high air speeds, limit switches 344 and 346 determine the maximum angular movement of operating arm 348 and thus maximum movement of the elevator surface, whereas for medium air speeds, limit switches 348 and 347 determine the maximum angular movement of arm 348 and thus the maximum angular movement of the elevator of the aircraft.

Reference has heretofore been made to the fact that the elevator control surface of the aircraft has a normal average position, and it was further mentioned that the elevator may assume a new position from this average position. This angular displacement of the elevator as mentioned resulted in an operation of the centering motor 350 to reposition the actuating arm 348 to maintain it symmetrical with respect to the high and medium air speed limit switches. With the elevator as thus displaced and the elevator servomotor 213 in a normal condition when it is non-operating, the clutch coil 199 is deenergized. With the clutch coil 199 deenergized, the gear train drive shaft corresponding with shaft 27 in the aforesaid patent to Lear et al. has its disc 26 engaged with a brake surface 41 and disengaged from the armature of the motor. With the elevator in the new average position as stated, the air stream exerts a turning moment thereon. The turning effort to move the elevator is resisted by the braking action of motor 213.

The apparatus includes a novel arrangement for aerodynamically offsetting the turning moment on the control surface and therefore relieves the servomotor of the effort required to oppose movement.

This aero-dynamic balance of the elevator is provided by displacing the trim tab thereof in an opposite direction from the displacement of the elevator. The trim tab is positioned by actuating means 387 extending from a drum 386 operated through a gear train (not shown) by a drive shaft 385 of a trim tab actuator 380. The actuator 380 is powered by a capacitor induction motor having field windings 381 and 382, one end of each of the phase windings being connected to ground and the opposite ends of the phase windings being bridged by a condenser 383. The actuator includes a conventional rotor 384. The actuator additionally includes an operating coil 389 having one end connected to ground and its other end connected by conductor 388 to conductor 16E. The coil 389 controls the engagement or disengagement of output shaft 385 with the rotor 384 in a manner similar to that shown in FIGURE 3 of the patent to Lear et al. 2,267,114. Thus when the coil 389 is energized, the shaft 385 is coupled with the rotor 384 and when coil 389 is deenergized, shaft 385 is disengaged from rotor 384 and brought into engagement with a brake surface.

The direction of rotation of actuator 380 is controlled by a servomotor torque responsive switch arrangement 394. The arrangement comprises a resilient member such as a spiral spring 395 affixed at one end to cable drum 211 and fixed at its other end to output shaft 212. Carried by output shaft 212 is a contact arm 396 which coacts with opposed pivoted contacts 392, 393 on drum 211. A conductor 390 extends from contact 392 directly to the ungrounded end of phase winding 381 while a conductor 391 extends from pivoted contact 393 directly to the ungrounded end of phase winding 382.

With a continued displacement of the elevator, the air stream as stated will exert a turning effort on the displaced elevator. This results in a torque applied to drum 211 which is transmitted through the elastic member 395 to the servomotor shaft 212 which as stated is held in braked condition. Due to the elastic member 395, the drum 211 may rotate with respect to shaft 212 thereby bringing contact 392 or contact 393, depending upon the direction of the movement on the displaced elevator, into engagement with arm 396. Arm 396 is connected by conductor 397 through normally closed contacts of relays 400 and 404 to a source of alternating voltage and when the arm engages either of the contacts, 392 or 393, the circuit is completed through one phase winding directly and through the capacitor and other phase winding of the induction motor to effect rotation of the trim tab. As the tab is displaced, the countermoment of the air stream on the trim tab tends to balance the moment on the main elevator surface. Such displacement of the tab continues until the turning effort on cable drum 211 is relieved. With the turning effort relieved, the elastic member 395 moves the drum 211 until the arm 396 is centered with respect to contacts 392 and 393.

The connection of conductor 397 to the source of alternating voltage is controlled as stated by two relays 400 and 404. Relays 400 and 404 are of the single pole single throw type. Relay 400 comprises an operating coil 401, an operable arm 402, and a contact 403. Relay 404 comprises a coil 405, an operable arm 406, and a contact 407. With the coil 404 unenergized, arm 402 engages contact 407. A conductor 408 extends from conductor 14E to one end of coil 401 with the opposite end of the coil being connected by conductor 188 to servo conductor 338. A conductor 409 extends from conductor 15E to one end of relay operating coil 405 with the opposite end of the coil connected by conductor 189 to servo lead 339. Conductor 397 is connected to arm 406. A conductor 411 connects contacts 403 and 407, while a conductor 410 connected to the source of alternating voltage is also connected to relay arm 402. The apparatus finally includes a manually operable single pole double throw engage switch 412 for connecting battery 286 with conductor 413 by means of which operating coils 414 of all the engage relays are energized.

In operation, the aircraft with the apparatus installed has its control surface conventionally manually controlled from the time it leaves the ground until it reaches an altitude when automatic control is to be applied. In the various amplifier networks, and considering them in sequence, in network 27 sliders 31, 43, 70, 64, 73, and 77 are generally at the midpoint of their respective resistors. Likewise in network 127, sliders 131, 148, 154, are at the midpoint of their respective resistors; and in network 227, sliders 231, 250, 260, 290 are at the midpoint of their respective resistors and slider 276 is at the right end of resistor 275 as shown.

The manner in which a signal voltage is generated may be considered with respect to generator 55 in network 27. With slider 58 at the center of its resistor 57. its potential is the same as that of conductor 54 connected to the center tap of secondary winding 59. If slider 58 be moved toward the left from its center position its potential, in the half cycle under consideration as indicated by the plus and minus signs affixed to the secondary winding 59, is negative with respect to the conductor 54. Again, if the slider 58 be moved to the right from its center position and with the polarity across the secondary winding 59 as shown, the slider 58 is positive with respect to conductor 54. Thus it is apparent that a negative or positive voltage is applied across the input terminals of amplifiers 24, 25 depending upon the direction in which slider 58 is moved from its center position. The magnitude of such voltage depends upon the extent that slider 58 is adjusted. Likewise in generator 51 the voltage between slider 44 and conductor 42 depends upon the direction of movements of slider 44 from its midposition. The amount of voltage selected from generator 51 due to the relative displacement of slider 44 from its midpoint may be varied by the voltage selection potentiometer 48. It is clear that with slider 50 at its lower position that all of the voltage between slider 44 and conductor 42 is applied to network 27. On the other hand if slider 50 be at the upper end of resistor 49 none of the voltage between slider 44 and conductor 42 will be applied to aileron network 27. In a similar manner any other voltage selection potentiometer may have its slider adjusted to select various portions of the voltage output of its associated generator that is to be utilized in a network. It is considered apparent that the various voltage signal generators are connected in electrical series relationship and that as thus connected each network may supply a resultant voltage to its associated amplifier depending upon the algebraic sum of the signals of various polarities or phases generated in the respective voltage generators.

With the aircraft placed in level flight position and with the single pole double throw switch 412 engaged with conductor 416 whereby the directional arm lock 87 is energized the various bridge networks are normally in balanced condition. However, if the attitude of the aircraft differs from the attitude of the vertical gyroscope for example in the roll axis, the aileron network 27 would be unbalanced. This would result in the energization of one or the other relays in amplifier 21. The trim potentiometer 56 may have its slider 58 manually adjusted so neither relay in amplifier 51 is operated at which time the aileron network is in a balanced condition.

In a similar manner the elevator network may be brought into a balanced condition by operating slider 260 of the trim potentiometer 258 so neither relay 243 nor 244 of the elevator amplifier 221 is energized.

With the apparatus and the aircraft in a similar trimmed condition, the single pole switch 412 may be moved to engage conductor 413 to thereby energize the elevator, rudder, and aileron engage relays, 17E, 17R, and 17A. Direct voltage is applied from battery 286 and the several conductors 18E, 18R, 18A through the operated relay 17 associated therewith to corresponding conductor 16 to energize the coil corresponding with coil 203 of the elevator servometer 213 to interconnect a drive shaft of the gear train with the servomotor output shaft.

Stabilization is provided by the mechanism in a well known manner by considering in the elevator channel network 227 the effect of a change in pitch attitude of the aircraft. Such change in pitch attitude is accompanied by a movement of slider 290 from the midpoint of resistor 289 causing the operation of relay 243 or 244 depending upon the direction of movement of the slider 290. With relay 243 operated, a circuit extends from battery 286 through conductor 245, operated relay 243, engage relay 17E to conductor 14E and at low air speeds through relay arm 326, contacts 328, 334, arm 332, servo conductor 338, servo limit switch 207, motor winding 197, clutch coil 199, armature 200 to ground and return to battery 286. The servo motor 213 as energized operates the servo drum 211 to effect through cables 210 adjustment of the elevator and concurrently through its follow-up drive 232 operates slider 231 of generator 228 to balance network 227. As the aircraft, due to the displaced elevator and accompanying turning moment, changes its attitude towards its original position, the vertical gyroscope 284 moves slider 290 back towards center position resulting in an opposite unbalance of network 227. This opposite unbalance of network 227 causes amplifier relay 244 to be operated resulting in energization of conductor 15E which is transmitted through (at low air speeds) arm 327, contacts 329 and 335, arm 333, conductor 339, servomotor limit switch 215, motor winding 198, clutch coil 199, armature 200, ground and return to battery 286. The amount of elevator displacement is thereby decreased with the craft continuing to move toward its normal position. When such normal position is attained, the elevator when the aircraft is subject to only transient disturbances is returned to its original position.

As more power is applied to the engines that propel the craft, the airspeed of the aircraft increases. With increased airspeed, if it be desired to have no more than the same moment on the control surface for the same change in pitch of the aircraft due to a transient disturbance as described, the amount of control surface displacement for the disturbance should be decreased since the moment on a displaced control surface varies approximately as the square of the speed of the aircraft. Thus as the airspeed increases the bellows 302 is compressed resulting in engagement of contact arm 306 with contact 307 and the resulting operation of motor 310 to increase the tension in spring 321 by moving member 317 to the right. This is accompanied by the operating member 26 moving slider 235, for example, in the voltage generator 228 of network 227 toward the upper end of resistor 234. This adjustment of slider 235 results in a greater proportion of the voltage between follow-up slider 231 and conductor 242 connected to the center tap of secondary winding 239 being utilized in network 227 and thus a rebalance of network 227 is achieved with less movement of slider 231. Thus the movement of slider 231 denotes that the elevator surface has been displaced a small angular amount so that the turning moment of the control surface is held approximately the same and thus the structure of the aircraft is not overstressed. In a similar manner, with increase in airspeed, the slider 80 of the rudder gain potentiometer 79 is moved toward the lower end of resistor 81 to decrease the amount of turn signal derived either from the turn control voltage generator 71 or the heading stabilizing voltage generator 85 into the rudder network 137.

The increase in airspeed as stated, moves the member 317 toward the right to render ineffective as stated the energizing means for operating coil 330 of relay 331 and upon further increases in airspeed renders the energizing means for operating coil 324 of relay 325 ineffective. Thus the maximum permissible rotation of servomotor 213 is reduced from that provided by limit switches 207, 215 at low airspeeds to that provided by medium airspeed limit switches 345, 347 at medium airspeeds and eventually to that permitted by switches 344 and 346 for high airspeeds.

It will be recalled that the limit-centering motor 350 operates as a function of the average position of the elevator servo 213. If the servo, either due to malfunction or in response to some ill-advised adjustment, should attempt to travel beyond the safe operating limits at high or middle air speeds, the limit switch system 340 would stop the servo 213. But the limit centering motor 350, being aware that the servo was lingering in an off center position, would normally recenter the limit system, effectively moving the limits of the servo and possibly endangering the airplane. To prevent this, the limit centering motor 350 operates normally only when the servo is operating normally, that is, when the servo is not in the limits; when the servo goes into the limits, the centering or averaging action is stopped by the action of either relay 400 or 404.

The trim actuator is also stopped when the system is in the limits, in order to prevent the trim actuator 380 from displacing the trim tab in case of malfunction of the steering apparatus. Obviously, if the steering system is in the limit due to malfunction, having improper trim tab position would further complicate the situation when the pilot again manually operates the control surfaces.

It will now be apparent that there has been disclosed a desirable arrangement for reducing the displacement of a control surface as the airspeed of the craft increases in order to maintain approximately constant a turning effort of such control surface on the aircraft for the same change in attitude of said craft about an axis thereof and that the maximum permissible displacement of the servomotor of such surface is also varied with airspeed to prevent excessive displacement of such surface should a self-balancing arrangement for normally limiting movement of said servomotor become inoperative due to a mechanical failure or the like. While I have shown and described but one embodiment of my invention, it will occur to those skilled in the art in view of the above description that various changes and modifications may be made without departing from the principles of my invention, and therefore contemplate in the following claims to cover all such changes and modifications as fall within the scope of my invention.

What is claimed is:

1. Control apparatus for an aircraft having a control surface for positioning said craft about an axis thereof, comprising: an electric servo motor adapted to position said surface; a plurality of circuit means for reversibly operating said motor each circuit means including at least one of a plurality of limit switches sequentially operated by said servomotor solely for terminating operation of said servomotor at various positions; and air speed responsive switch means in said circuits operated selectively in accordance with the magnitude of the airspeed for selecting which one of the plurality of limit switches is effective on operation to terminate servomotor operation.

2. Control apparatus for a dirigible craft comprising: means including an electric motor operable for changing the attitude of said craft about an axis thereof; circuit means for reversibly operating said motor; a plurality of limit switches in said circuit sequentially operable by said motor during said operation for terminating operation of said motor; air pressure responsive means; and shunting means connected to the circuit means and switches and operatively controlled by said pressure responsive means for alternatively operating said motor for selecting which limit switch when operated is effective to terminate said motor operation to vary the permissible extent of operation in accordance with air pressure.

3. Control apparatus for a dirigible craft comprising: motor operated means for changing the attitude of said craft about an axis thereof; control means for effecting operation of said motor; a plurality of motor operation limiting means in said control means operable sequentially by said motor during increase in displacement thereof in one direction; and air pressure responsive means connected with said plurality of limiting means in said control means for selecting the position at which motor operation is to terminate on operation of one of said limiting means by said motor.

4. Control apparatus for an aircraft having a control surface for varying craft attitude about an axis comprising: a motor adapted to operate said surface; a balanceable control means including a plurality of circuits selectively effective for operating said motor in one direction on unbalance thereof said control means including a first operable device for unbalancing said control means and a second motor operated device for rebalancing said control means; motor operation limiting devices in said plurality of circuits operable sequentially by said motor for variously terminating operation of said motor; means for modifying in accordance with the speed of said craft the extent of operation of said second motor operated device with respect to a given operation of said first device; and further means in said control means for selecting in accordance with speed of said craft one of the circuits for operating the motor and thus determine which operation limiting device when operated is to effect termination of said motor operation despite unbalance of said control means.

5. Control apparatus for a dirigible craft having a control surface for varying the attitude of said craft about an axis thereof, said apparatus comprising: a motor adapted to operate said surface; a balanceable control means having a control device and a follow-up device for operating said motor; means for moving said follow-up device from said motor to effect movement of said motor in accordance with the movement of said control device; further means comprising a plurality of limit switches in said control means operated sequentially by said motor for variably terminating movement in one direction of said motor; and means responsive to the speed of said craft and connected to said further means for selecting which limit switch is to terminate operation of said motor despite unbalance of said control means.

6. Control apparatus for an aircraft having a control surface for controlling the movement of said craft about an axis thereof, said apparatus comprising: position-maintaining means for detecting an angular movement of said craft about said axis; rate-responsive means for detecting rate of angular movement of said craft about said axis; servo means for operating said control surface; signal providing means operated by said position-maintaining means, said rate-responsive means, and said servo means for generating control signals; control means connected to the signal means for algebraically adding and control signals and controlling said servo means in accordance with the resultant voltage selectively through any of a plurality of circuits; and means responsive to the linear speed of said aircraft and connected to the rate responsive signal generator for varying the voltage generated by said rate-responsive means generator; limit switches in said circuits and sequentially responsive to servo operation for terminating operation of said servo means despite the presence of a resultant voltage; and switch means in said circuits responsive to the speed of said craft for selecting the control circuit for the servo means and thus the limit switch which will terminate operation of said servo means when operated thereby.

7. A motor means for operating a control surface of an aircraft, the surface having a trim tab a controller including two alternatively operable switches for reversibly controlling said motor means; a balanceable network for operating said controller to operate one or the other switch depending on direction of unbalance of said network; means responsive to a change in a condition of said aircraft for unbalancing said network; follow-up means driven by said motor means for rebalancing said network; further means in said motor means responsive to continued force on the motor means due to displacement of said surface from unoperated position; circuit means rendered ineffective by operation of either switch or effective with both switches unoperated; and trim tab actuating means controlled by the effective circuit means and said further means for operating an auxiliary tab on said control surface to counterbalance said force.

8. Control apparatus for an aircraft having ailerons and rudder, said apparatus comprising: a motor adapted to operate said ailerons; a motor adapted to operate said rudder; a balanceable voltage network means for operating said aileron motor; a balanceable voltage network means for operating said rudder motor; manually operable heading selecting voltage providing means in said networks for unbalancing both networks to operate both motors; follow-up means in each network driven by each respective motor for rebalancing its respective network; means responsive to the bank of the aircraft from the displaced aileron for opposing said manual means effect in said aileron motor network; voltage providing means responsive to the rate of change of heading of the craft to oppose said manual voltage providing means in said rudder network; a voltage dividing potentiometer having its resistor connected across the manual voltage providing means in the rudder network and its slider connected to the network to vary the magnitude of the manual provided voltage utilized; and means responsive to the linear speed of said aircraft and operatively connected to the slider for relatively varying the extent of unbalance of said aileron and rudder motor networks from said manually operable heading selecting means.

9. Control apparatus for an aircraft having ailerons and rudder, said apparatus comprising: a motor adapted to operate said ailerons; a motor adapted to operate said rudder; a balanceable network means connected to the first motor for operating said aileron motor on network unbalance; a balanceable network means connected to the second motor for operating said rudder motor on network unbalance; directional stabilizing control means connected to both networks for unbalancing simultaneously both networks to operate both motors; follow-up means driven by each motor for rebalancing its respective network; and means responsive to the speed of said aircraft and connected to the directional control means for relatively varying the extent of unbalance of said aileron and rudder motor networks from said directional control means.

10. Control apparatus for an aircraft having a control surface, said apparatus comprising: motor means for operating said control surface from a normal position; control means connected to the motor means including a balanceable network for reversibly controlling operation of said motor means; means in said network displaceable from a normal position for unbalancing said network to initiate motor means operation; follow-up means in said network for rebalancing said network driven by said motor means to normally terminate operation thereof; a pair of motor operation controlling limit switches in said control means; a limit switch actuator between said switches; gear differential means operable by said motor means for moving said actuator; further means operated by said actuator and effective on continued displacement of said control surface and motor means from said normal position and operable on said differential means to centrally position said actuator relative to said limit switches; and means in said further means and limit switch controlled for rendering said further means ineffective upon actuation of a limit switch.

11. Apparatus for operating a device for controlling a condition; said apparatus comprising: a motor for operating said device; control means including a balanceable network connected to the motor for reversibly controlling operation of said motor; means in said network displaceable from a normal position for unbalancing said network to initiate motor operation; follow-up means in said network for rebalancing said network and driven by said motor to normally terminate operation thereof; a pair of motor controlling limit switches in said control means; a limit switch actuator having a normal position intermediate said switches; further means connected to the motor and actuator for operating said actuator from said motor whereby a limit switch may be actuated to determine maximum motor operation; adjustable means controlled by said actuator and operably connected to the actuator for relatively moving said actuator and said limit switches on continued displacement of said actuator from said normal position to centrally dispose said actuator relatively to said switches; and means connected with the adjustable means and limit switches for preventing operation of said adjustable means upon actuation of a limit switch.

12. Control apparatus for an aircraft having a control surface provided with a trim tab, said apparatus comprising: servo motor means for operating said control surface from a normal position; a motor for positioning said trim tab; control means including a balanceable network for reversibly controlling operation of said servo motor means; means in said network displaceable from a normal position for unbalancing said network to initiate servo motor means operation; follow-up means in said network for rebalancing said network driven by said servo motor means to normally terminate operation thereof; a pair of servo motor operation controlling limit switches in said control means; means driven by said servo motor means and intermediate said limit switches for actuating either switch upon maximum allowable operation of said servo motor means; switch means connected to the servo motor and effective upon continued displacement of said surface from said normal position for operating said trim tab motor; and further means connected to said switch means for preventing operation of said trim tab motor upon actuation of either limit switch.

13. Control apparatus for an aircraft having a control surface for varying the attitude of said craft about an axis thereof; said apparatus comprising: a motor adapted to operate said surface; a plurality of potentiometers connected in electrical series relation to provide a resultant voltage signal; position maintaining means for moving the slider of one potentiometer; manual means for adjusting the slider of a second potentiometer; means for moving the slider of a third potentiometer from said motor; control means connected to said series connected potentiometers and adapted to operate said motor in accordance with the magnitude of the resultant voltage; devices in said control means operable by said motor for variably terminating extent of operation of said motor in one direction irrespective of the resultant voltage magnitude; and means responsive to the speed of said craft and connected to the control means for selecting which device when operated by said motor is to terminate operation thereof despite the presence of a resultant voltage.

14. An apparatus comprising a motor for operating a condition controlling device; means comprising a balanceable electrical network for controlling energization of said motor; means responsive proportionally to a condition for unbalancing said network; follow-up means operated by said motor for rebalancing said network to thereby normally terminate motor operation; a plurality of operation limit switches sequentially and selectively operable by said motor in the energizing circuit of said motor for variably determining the maximum extent of operation of said motor; and circuit selecting means connected to the switches and responsive to a second condition for selecting which limit switch when operated will terminate motor operation.

15. Control apparatus for an aircraft having ailerons and rudder, said apparatus comprising: a motor adapted to operate said ailerons; a motor adapted to operate said rudder; a balanceable voltage network means for operating said aileron motor; a balanceable voltage network means for operating said rudder motor; manually operable heading selecting voltage providing means in said networks for unbalancing both networks to operate both motors; follow-up means in each network driven by each respective motor for rebalancing its respective network; means responsive to the bank of the aircraft from the displaced aileron for opposing said manual means effect in said aileron motor network; voltage providing means responsive to the rate of change of heading of the craft to oppose said manual voltage providing means in said rudder network; a voltage dividing potentiometer having its resistor connected across the manual voltage providing means in the rudder network and its slider connected to the network to vary the magnitude of the manual provided voltage utilized; means responsive to the linear speed of said aircraft and operatively connected to the slider for relatively varying the extent of unbalance of said aileron and rudder motor networks from said manually operable heading selecting means; and further means operated by said means responsive to the speed of said aircraft for additionally varying the rebalancing effect of each follow-up means inversely with the linear speed of said aircraft.

16. Control apparatus for an aircraft having a control surface for altering the attitude of said aircraft, said apparatus comprising: a motor means adapted to operate said surface; control means connected to said motor means including a balanceable network having an initial balanced condition for controlling the direction of movement of said surface in accordance with the direction of unbalance of said network; means responsive to a change in a condition for unbalancing said network to operate said motor means; follow-up means driven by said motor means for rebalancing said network to terminate operation of said motor means; limit switches operable by said motor means, to predetermine maximum movement of said motor and said follow-up means in either direction from a normal position assumed at said initial balanced condition; and further means operably connected with said limit switches and operative upon continuation of a change in the motor position from the normal position indicating a continuation of a change in said condition despite operation of said surface; and additional means operated by said further means adjusting said switches, to equally restrict further movement in either direction of said follow-up means from said changed position of the motor.

17. Control apparatus having a device for adjusting a condition, said apparatus comprising: a motor adapted to operate said device; control means including a balanceable network for controlling the direction of movement of said motor in accordance with the direction of unbalance of said network; means in said network responsive to a change in a condition from an initial value for unbalancing said network to operate said motor; follow-up means in said network driven by said motor for rebalancing said network to terminate operation of said motor; a limit switch actuator driven by said motor; limit switches in said control means alternatively operable by said motor driven actuator and symmetrically located with respect to the original steady state position of said motor driven actuator to predetermined maximum movement of said motor and said follow-up means in either direction from said original motor position; further means in said network for adjusting the normal value of the condition to be maintained by said condition responsive device and associated with said network and effecting permanent change of said motor driven actuator from its original position to a new steady state position; and means for readjusting the position of said limit switches relative to said switch actuator to permit equal maximum movements of said motor in either direction from the new position of said switch actuator.

*18. An aircraft flight control system for enabling the craft to approach and thereafter maintain a selected heading comprising a first signal responsive means for providing a first output indicative of a required change in craft roll attitude to cause said craft to approach and maintain said selected heading, a second signal responsive means for providing a second output indicative of a required change in craft yaw attitude to cause said craft to approach and maintain said selected heading, means for providing an error signal corresponding to the magnitude of the desired heading change, means for providing a signal corresponding to the roll attitude of said craft, means for providing a signal corresponding to the rate of yaw of said craft, means for supplying said error signal and said roll attitude signal to said first signal responsive means for controlling the same in accordance with the algebraic sum thereof, means for supplying said error signal and said rate of yaw signal to said second signal responsive means for controlling the same in accordance with the algebraic sum thereof, and means for varying the relative magnitude of the heading error signal supplied to each of said signal responsive means in accordance with craft air speed.*

*19. A craft navigation system by means of which the craft may be controlled to approach and thereafter maintain a desired heading comprising means for supplying a heading deviation signal corresponding to the difference between the existing craft heading and a desired craft heading, means for supplying a signal corresponding to the rate of yaw of said craft, means for supplying a signal corresponding to the angle of roll of said aircraft, means responsive to said heading deviation signal and said yaw rate signal for supplying a first turn control signal corresponding to the algebraic sum thereof, means responsive to said heading deviation signal and said angle of roll signal for supplying a second turn control signal corresponding to the algebraic sum thereof, and means responsive to the air speed of said craft for varying the relative magnitude of said heading deviation signal supplied to each of said last-two-mentioned means whereby to vary the relative responses thereof in accordance with the air speed of said craft.*

*20. An aircraft flight control system for enabling the craft to approach and thereafter maintain a selected heading comprising a first signal responsive means for providing a first output by which to control craft roll attitude to cause said craft to approach and maintain said selected heading, a second signal responsive means for providing a second output by which to control the craft about its normally vertical or yaw axis to cause said craft to approach and maintain said selected heading, means for providing an error signal corresponding to the magnitude of the desired heading change, means for providing a signal corresponding to the roll attitude of said craft, means for providing a signal corresponding to the rate of yaw of said craft, means for supplying said error signal and said roll attitude signal to said first signal responsive means for controlling the same in accordance with the algebraic sum thereof, means for supplying said error signal and said rate of yaw signal to said second signal responsive means for controlling the same in accordance with the algebraic sum thereof, and means for varying the relative magnitude of the heading error signal supplied to said signal responsive means in accordance with craft air speed.*

*21. A craft navigation system by means of which the craft may be controlled to approach and thereafter maintain a desired heading comprising means for supplying a heading deviation signal corresponding to the difference between the existing craft heading and a desired craft heading, means for supplying a signal corresponding to the rate of yaw of said craft, means for supplying a signal corresponding to the angle of roll of said aircraft, means responsive to said heading deviation signal and said yaw rate signal for supplying a first turn control signal corresponding to the alegbraic sum thereof, means responsive to said heading deviation signal and said angle of roll signal for supplying a second turn control signal corresponding to the algebraic sum thereof, and means responsive to the air speed of said craft for varying the relative magnitude of said heading deviation signal supplied*

*to said last-two-mentioned means whereby to vary the relative responses thereof in accordance with the air speed of said craft.*

*22. Apparatus as set forth in claim 21 wherein said means responsive to the air speed of the craft for varying said heading signal comprises variable impedance means connected to receive said heading deviation signal, and means for varying the value of impedance thereof in accordance with craft air speed whereby to vary the magnitude of said heading signal supplied to said last two-mentioned means in accordance with craft air speed.*

*23. A craft navigation system of the character set forth in claim 21 wherein the relative magnitude of said heading deviation signal supplied to said last-two-mentioned means is simultaneously and progressively varied in accordance with craft air speed.*

References Cited in the file of this patent or the original patent

UNITED STATES PATENTS

| | | |
|---|---|---|
| 1,882,730 | Avery | Oct. 18, 1932 |
| 2,298,820 | Chase | Oct. 13, 1942 |
| 2,356,339 | Morrison | Aug. 22, 1944 |
| 2,387,795 | Isserstedt | Oct. 30, 1945 |
| 2,392,381 | Hanson et al. | Jan. 8, 1946 |
| 2,445,900 | Wisman | July 27, 1948 |
| 2,448,167 | Baak | Aug. 31, 1948 |
| 2,452,311 | Markusen | Oct. 26, 1948 |
| 2,516,796 | Noxon et al. | July 25, 1950 |
| 2,568,719 | Curry | Sept. 25, 1951 |
| 2,626,114 | Alderson | Jan. 20, 1953 |
| 2,654,061 | Gille | Sept. 29, 1953 |
| 2,656,134 | Hanna et al. | Oct. 20, 1953 |